United States Patent
Hashimoto

(10) Patent No.: US 10,508,412 B2
(45) Date of Patent: Dec. 17, 2019

(54) CONTROL SYSTEM FOR WORK VEHICLE, AND METHOD FOR SETTING TRAJECTORY OF WORK IMPLEMENT

(71) Applicant: KOMATSU LTD., Tokyo (JP)

(72) Inventor: Kazuhiro Hashimoto, Tokyo (JP)

(73) Assignee: KOMATSU LTD., Tokyo (JP)

( * ) Notice: Subject to any disclaimer, the term of this patent is extended or adjusted under 35 U.S.C. 154(b) by 96 days.

(21) Appl. No.: 15/579,963

(22) PCT Filed: Mar. 31, 2017

(86) PCT No.: PCT/JP2017/013731
§ 371 (c)(1),
(2) Date: Dec. 6, 2017

(87) PCT Pub. No.: WO2018/179383
PCT Pub. Date: Oct. 4, 2018

(65) Prior Publication Data
US 2019/0218747 A1  Jul. 18, 2019

(51) Int. Cl.
*E02F 3/84* (2006.01)
*E02F 9/26* (2006.01)
(Continued)

(52) U.S. Cl.
CPC ............. *E02F 3/841* (2013.01); *E02F 3/43* (2013.01); *E02F 3/815* (2013.01); *E02F 3/84* (2013.01); *E02F 3/844* (2013.01); *E02F 9/20* (2013.01); *E02F 9/2029* (2013.01); *E02F 9/2045* (2013.01); *E02F 9/262* (2013.01); *G05D 1/00* (2013.01); *G05D 1/02* (2013.01);
(Continued)

(58) Field of Classification Search
CPC ......... E02F 3/841; E02F 3/844; E02F 9/2029; E02F 9/2045; E02F 9/262; E02F 3/7618; E02F 9/2228; G05D 1/0219; G05D 1/0278; G05D 2201/0202
USPC .......................................................... 701/50
See application file for complete search history.

(56) References Cited

U.S. PATENT DOCUMENTS 5,564,507 A  10/1996  Matsushita et al.
5,950,141 A  9/1999  Yamamoto et al.
(Continued)

FOREIGN PATENT DOCUMENTS

JP  7-54374 A  2/1995
JP  8-506870 A  7/1996
(Continued)

OTHER PUBLICATIONS

US 5,526,002 A, 06/1996, Gudat et al. (withdrawn)
(Continued)

*Primary Examiner* — Gertrude Arthur Jeanglaude
(74) *Attorney, Agent, or Firm* — Global IP Counselors, LLP

(57) ABSTRACT

A control system for a work vehicle includes a controller. The controller decides a target profile of a work site. The controller generates a command signal to move a work implement according to the target profile. The controller acquires the load to which the work vehicle is subjected. The controller modifies the target profile according to the magnitude of the load. The controller generates a command signal to operate the work implement according to the modified target profile.

15 Claims, 16 Drawing Sheets

(51) Int. Cl.
  *E02F 9/20* (2006.01)
  *E02F 3/43* (2006.01)
  *E02F 3/815* (2006.01)
  *G05D 1/00* (2006.01)
  *G05D 1/02* (2006.01)
  *E02F 3/76* (2006.01)
  *E02F 9/22* (2006.01)

(52) U.S. Cl.
  CPC ........... *E02F 3/7618* (2013.01); *E02F 9/2228* (2013.01); *G05D 1/0219* (2013.01); *G05D 1/0278* (2013.01); *G05D 2201/0202* (2013.01)

(56) References Cited

U.S. PATENT DOCUMENTS

| | | | |
|---|---|---|---|
| 5,984,018 A | 11/1999 | Yamamoto et al. | |
| 6,181,999 B1 | 1/2001 | Yamamoto et al. | |
| 7,857,071 B1 | 12/2010 | McCain et al. | |
| 8,548,690 B2 | 10/2013 | Hayashi | |
| 2013/0297155 A1* | 11/2013 | Ekvall | E02F 9/2029 701/50 |
| 2014/0180547 A1 | 6/2014 | Edara et al. | |

FOREIGN PATENT DOCUMENTS

| | | |
|---|---|---|
| JP | 10-88612 A | 4/1998 |
| JP | 10-147952 A | 6/1998 |
| JP | 5247939 B1 | 4/2013 |

OTHER PUBLICATIONS

Examination Report No. 1 for the corresponding Australian application No. 2017272278, dated Jun. 20, 2018.

The International Search Report for the corresponding international application No. PCT/JP2017/013731, dated May 9, 2017.

\* cited by examiner

CONTROL SYSTEM FOR WORK VEHICLE, AND METHOD FOR SETTING TRAJECTORY OF WORK IMPLEMENT

CROSS-REFERENCE TO RELATED APPLICATIONS

This application is a U.S. National stage application of International Application No. PCT/JP2017/013731, filed on Mar. 31, 2017.

BACKGROUND

Field of the Invention

The present invention relates to a control system for a work vehicle, and to a method for setting the trajectory of a work implement.

Description of the Related Art

It has been proposed in the past that with a bulldozer, a grader, or another such work vehicle, control be performed to automatically adjust the position of a blade or other such work implement. For instance, in Japanese Patent No. 5,247,939, the position of the blade is automatically adjusted by load control that makes the load on the blade match a target load in digging work.

SUMMARY

With the conventional control mentioned above, the occurrence of track slippage can be suppressed by raising the blade when the load on the blade becomes excessively high. This allows the work to be performed more efficiently.

However, with conventional control, as shown in FIG. 18, the blade is first controlled to conform to a design terrain 100. If the load on the blade subsequently increases, the blade is raised by load control (see the trajectory 200 of the blade in FIG. 18). Therefore, when digging a terrain 300 with large undulations, the load exerted on the blade may increase rapidly, causing the blade to rise suddenly. If that happens, a very uneven terrain will be formed, making it difficult to perform digging work smoothly. Once a very uneven terrain is formed, it is subsequently difficult to perform digging work smoothly. Accordingly, it is preferable to perform digging work that does not result in a very uneven terrain.

It is an object of the present invention to perform work efficiently under automatic control and to make it less likely that work will form terrain with large irregularities.

The control system for a work vehicle according to a first aspect includes a controller. The controller is programmed to perform the following processing. The controller decides the target profile to be work. The controller generates a command signal for operating a work implement according to the target profile. The controller acquires the load on the work vehicle. The controller modifies the target profile according to the magnitude of the load. The controller generates a command signal for operating the work implement according to the modified target profile.

The method for setting the trajectory of a work implement according to a second aspect includes the following processing. The first processing is to decide the target profile of a work site. The second processing is to set the trajectory of a work implement so as to operate the work implement according to the target profile. The third processing is to acquire the load on the work vehicle. The fourth processing is to modify the target profile according to the magnitude of the load. The fifth processing is to set the trajectory of the work implement so as to operate the work implement according to the modified target profile.

The work vehicle according to a third aspect includes a work implement and a controller. The controller decides the target profile of a work site. The controller generates a command signal for operating the work implement according to the target profile. The controller acquires the load on the work vehicle. The controller modifies the target profile according to the magnitude of the load. The controller generates a command signal for operating the work implement according to the modified target profile.

With the present invention, it is possible to perform work efficiently under automatic control and to make it less likely that work will form terrain with large irregularities.

DETAILED DESCRIPTION OF EMBODIMENT(S)

Figure 1:
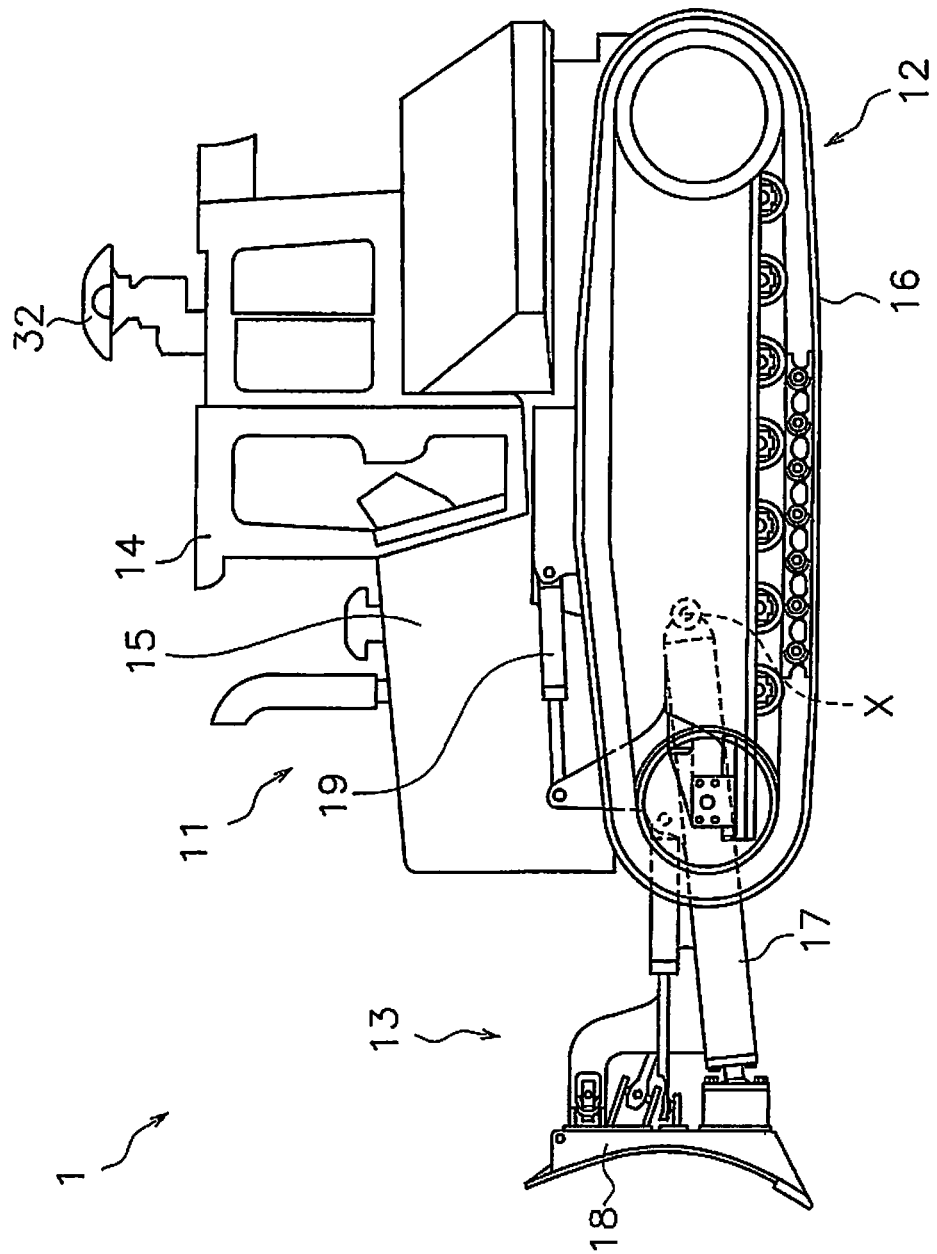
FIG. 1 is a side view of a work vehicle according to an embodiment.

The work vehicle according to an embodiment will now be described through reference to the drawings. FIG. 1 is a side view of the work vehicle 1 according to the embodiment. The work vehicle 1 in this embodiment is a bulldozer. The work vehicle 1 includes a vehicle body 11, a drive unit 12, and a work implement 13.

The vehicle body 11 includes a cab 14 and an engine compartment 15. A driver's seat (not shown) is disposed in the cab 14. The engine compartment 15 is disposed in front of the cab 14. The drive unit 12 is attached to the lower portion of the vehicle body 11. The drive unit 12 includes a pair of right and left crawler belts 16. Only the left crawler belt 16 is shown in FIG. 1. Rotation of the crawler belts 16 propels the work vehicle 1. The travel of the work vehicle 1 may be either autonomous travel, semi-autonomous travel, or travel under operation by the operator.

The work implement 13 is attached to the vehicle body 11. The work implement 13 includes a lift frame 17, a blade 18, and a lift cylinder 19.

The lift frame 17 is attached to the vehicle body 11 so as to be movable up and down around an axis X extending in the vehicle width direction. The lift frame 17 supports the blade 18. The blade 18 is disposed in front of the vehicle body 11. The blade 18 moves up and down as the lift frame 17 moves up and down.

The lift cylinder 19 is linked to the vehicle body 11 and the lift frame 17. As the lift cylinder 19 expands and contracts, the lift frame 17 rotates up and down around the axis X.

Figure 2:
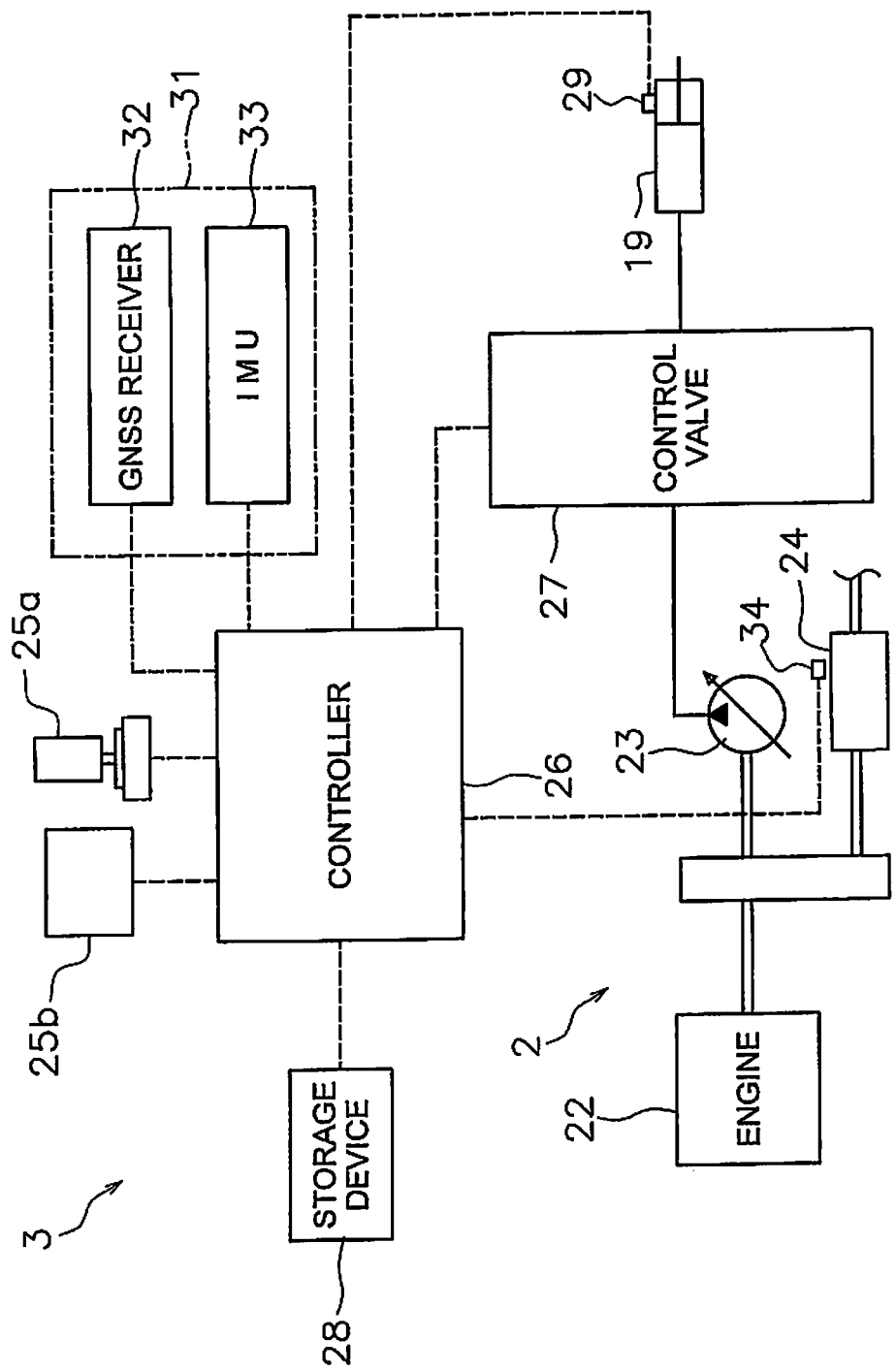
FIG. 2 is a block diagram of the configuration of the drive system and control system of the work vehicle.

FIG. 2 is a block diagram of the configuration of the drive system 2 and the control system 3 of the work vehicle 1. As shown in FIG. 2, the drive system 2 includes an engine 22, a hydraulic pump 23, and a power transmission device 24.

The hydraulic pump 23 is driven by the engine 22 and discharges hydraulic fluid. The hydraulic fluid discharged from the hydraulic pump 23 is supplied to the lift cylinder 19. In FIG. 2, just one hydraulic pump 23 is shown, but a plurality of hydraulic pumps may be provided.

The power transmission device 24 transmits the drive force of the engine 22 to the drive unit 12. The power transmission device 24 may be, for example, a hydro-static transmission (HST). Alternatively, the power transmission device 24 may be, for example, a torque converter or a transmission having a plurality of gears.

The control system 3 includes an operating device 25a, a control mode setting device 25b, a controller 26, a storage device 28, and a control valve 27. The operating device 25a is used to operate the work implement 13 and the drive unit 12. The operating device 25a is disposed in the cab 14. The operating device 25a receives operator inputs for driving the work implement 13 and the drive unit 12, and outputs an operation signal corresponding to the input. The operating device 25a includes, for example, a control lever, a pedal, a switch, or the like.

For example, the operating device 25a for the drive unit 12 is provided to allow for operation in a forward position, a reverse position, and a neutral position. An operation signal indicating the position of the operating device 25a is outputted to the controller 26. When the operation position of the operating device 25a is the forward position, the controller 26 controls the drive unit 12 or the power transmission device 24 so that the work vehicle 1 moves forward. When the operating position of the operating device 25a is the reverse position, the controller 26 controls the drive unit 12 or the power transmission device 24 so that the work vehicle 1 moves backward.

The control mode setting device 25b is, for example, a touch panel type of input device. However, the setting device 25b may be another input device such as a switch. The control modes include a load mode and a mode according to the blade specification, as discussed below. The load mode can be selected from among "light," "normal," and "heavy" modes. "Light" is a control mode in which the load on the blade 18 is light. "Heavy" is a control mode in which the load on the blade 18 is heavy. "Normal" is a control mode in which the load on the blade 18 is between "light" and "heavy."

The blade specification can be selected from "full" mode and "semi" mode, for example. "Full" mode is the control mode when a large blade 18 is mounted, and "semi" mode is the control mode when a small blade 18 is mounted.

The controller 26 is programmed to control the work vehicle 1 on the basis of acquired data. The controller 26 includes a processing device such as a CPU, for example. The controller 26 acquires an operation signal from the operating device 25a. The controller 26 controls the control valve 27 on the basis of the operation signal. The controller 26 is not limited to a single unit, and may be divided up into a plurality of controllers.

The control valve 27 is a proportional control valve and is controlled by a command signal from the controller 26. The control valve 27 is disposed between the hydraulic pump 23 and a hydraulic actuator such as the lift cylinder 19. The control valve 27 controls the flow of hydraulic fluid supplied from the hydraulic pump 23 to the lift cylinder 19. The controller 26 generates a command signal to the control valve 27 so that the blade 18 operates according to the operation of the operating device 25a discussed above. Consequently, the lift cylinder 19 is controlled according to the operation amount of the operating device 25a. The control valve 27 may be a pressure proportional control valve. Alternatively, the control valve 27 may be an electromagnetic proportional control valve.

Figure 3:
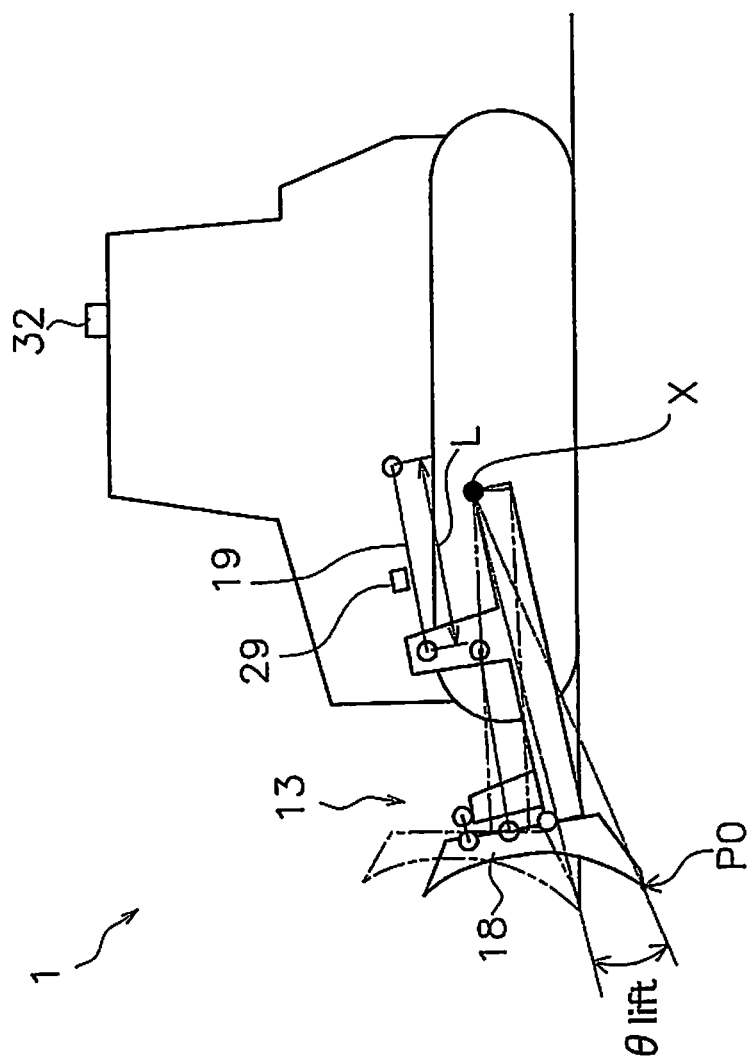
FIG. 3 is a simplified diagram of the configuration of the work vehicle.

The control system 3 includes a lift cylinder sensor 29. The lift cylinder sensor 29 senses the stroke length of the lift cylinder 19 (hereinafter referred to as "lift cylinder length L"). As shown in FIG. 3, the controller 26 calculates the lift angle θlift of the blade 18 on the basis of the lift cylinder length L. FIG. 3 is a simplified diagram of the configuration of the work vehicle 1.

In FIG. 3, the origin position of the work implement 13 is indicated by a two-dot chain line. The origin position of the work implement 13 is the position of the blade 18 in a state in which the cutting edge of the blade 18 is in contact with the ground on a horizontal surface. The lift angle θlift is the angle of the work implement 13 from the origin position.

As shown in FIG. 2, the control system 3 includes a position sensing device 31. The position sensing device 31 measures the position of the work vehicle 1. The position sensing device 31 includes a GNSS (global navigation satellite system) receiver 32 and an IMU 33. The GNSS receiver 32 is, for example, a GPS (global positioning system) receiver. The antenna of the GNSS receiver 32 is disposed on the cab 14. The GNSS receiver 32 receives positioning signals from a satellite and calculates the position of the antenna based on the positioning signal to generate vehicle position data. The controller 26 acquires vehicle position data from the GNSS receiver 32.

The IMU 33 is an inertial measurement unit. The IMU 33 acquires vehicle inclination angle data and vehicle acceleration data. The vehicle inclination angle data includes the angle of the vehicle longitudinal direction with respect to the horizontal (pitch angle), and the angle of the vehicle lateral direction with respect to the horizontal (roll angle). The vehicle acceleration data includes the acceleration of the work vehicle 1. The controller 26 obtains the travel direction and speed of the work vehicle 1 from the vehicle acceleration data. The controller 26 acquires vehicle inclination angle data and vehicle acceleration data from the IMU 33.

The controller 26 calculates a cutting edge position P0 from the lift cylinder length L, the vehicle position data, and the vehicle inclination angle data. As shown in FIG. 3, the controller 26 calculates the global coordinates of the GNSS receiver 32 based on the vehicle position data. The controller 26 calculates the lift angle θlift based on the lift cylinder length L. The controller 26 calculates the local coordinates of the cutting edge position P0 with respect to the GNSS receiver 32 based on the lift angle θlift and vehicle size data. The controller 26 calculates the travel direction and speed of the work vehicle 1 from the vehicle acceleration data. The vehicle size data is stored in the storage device 28 and indicates the position of the work implement 13 with respect to the GNSS receiver 32. The controller 26 calculates the global coordinates of the cutting edge position P0 based on the global coordinates of the GNSS receiver 32, the local coordinates of the cutting edge position P0, and the vehicle inclination angle data. The controller 26 acquires the global coordinates of the cutting edge position P0 as cutting edge position data.

The control system 3 includes an output sensor 34 for measuring the output of the power transmission device 24. If the power transmission device 24 is an HST that includes a hydraulic motor, the output sensor 34 may be a pressure sensor that senses the driving hydraulic pressure of the hydraulic motor. The output sensor 34 may be a rotation sensor that detects the output rotational speed of the hydraulic motor. If the power transmission device 24 includes a torque converter, the output sensor 34 may be a rotation sensor that senses the output rotational speed of the torque converter. A sensing signal indicating the sensed value from the output sensor 34 is outputted to the controller 26.

The controller 26 calculates the traction force from the sensed value of the output sensor 34. If the power transmission device 24 of the work vehicle 1 is an HST, the controller 26 can calculate the traction force from the driving hydraulic pressure of the hydraulic motor and the rotational speed of the hydraulic motor. The traction force is a load applied to the work vehicle 1.

If the power transmission device 24 includes a torque converter and a transmission, the controller 26 can calculate the traction force from the output rotational speed of the torque converter. More precisely, the controller 26 calculates the traction force from the following formula (1).

$$F = k \times T \times R / (L \times Z) \quad \text{Formula 1}$$

Here, F is the traction force, k is a constant, T is the transmission input torque, R is the reduction ratio, L is the crawler belt link pitch, and Z is the number of sprocket teeth. The input torque T is calculated on the basis of the output rotational speed of the torque converter. However, how the traction force is sensed is not limited to the above method, and it may be sensed by some other method.

The storage device 28 includes, for example, a memory and an auxiliary storage device. The storage device 28 may be, for example, a RAM, a ROM, or the like. The storage device 28 may be a semiconductor memory, a hard disk, or the like. The storage device 28 is an example of a non-transitory computer-readable recording medium. The storage device 28 records computer commands which is executable by a processor for controlling the work vehicle 1.

The storage device 28 stores design terrain data and work site terrain data. The design terrain data indicates the final design terrain. The final design terrain is the final target contour of the surface of the work site. The design terrain data is, for example, an earthmoving execution plan in a three-dimensional data format. The work site terrain data indicates the current terrain at the work site. The work site terrain data is, for example, a current topographical survey in a three-dimensional data format. The work site terrain data can be obtained by aerial laser survey, for example.

The controller 26 acquires the current terrain data. The current terrain data indicates the current terrain at the work site. The current terrain at the work site is the terrain of the region along the travel direction of the work vehicle 1. The current terrain data is acquired by calculation in the controller 26 from the work site terrain data and the position and travel direction of the work vehicle 1 obtained from the above-mentioned position sensing device 31. The controller 26 automatically controls the work implement 13 on the basis of the current terrain data, the design terrain data, and the cutting edge position data.

The automatic control of the work implement 13 may be semi-automatic control performed together with manual operation by the operator. Alternatively, the automatic control of the work implement 13 may be fully automatic control performed without any manual operation by an operator.

Figure 4:
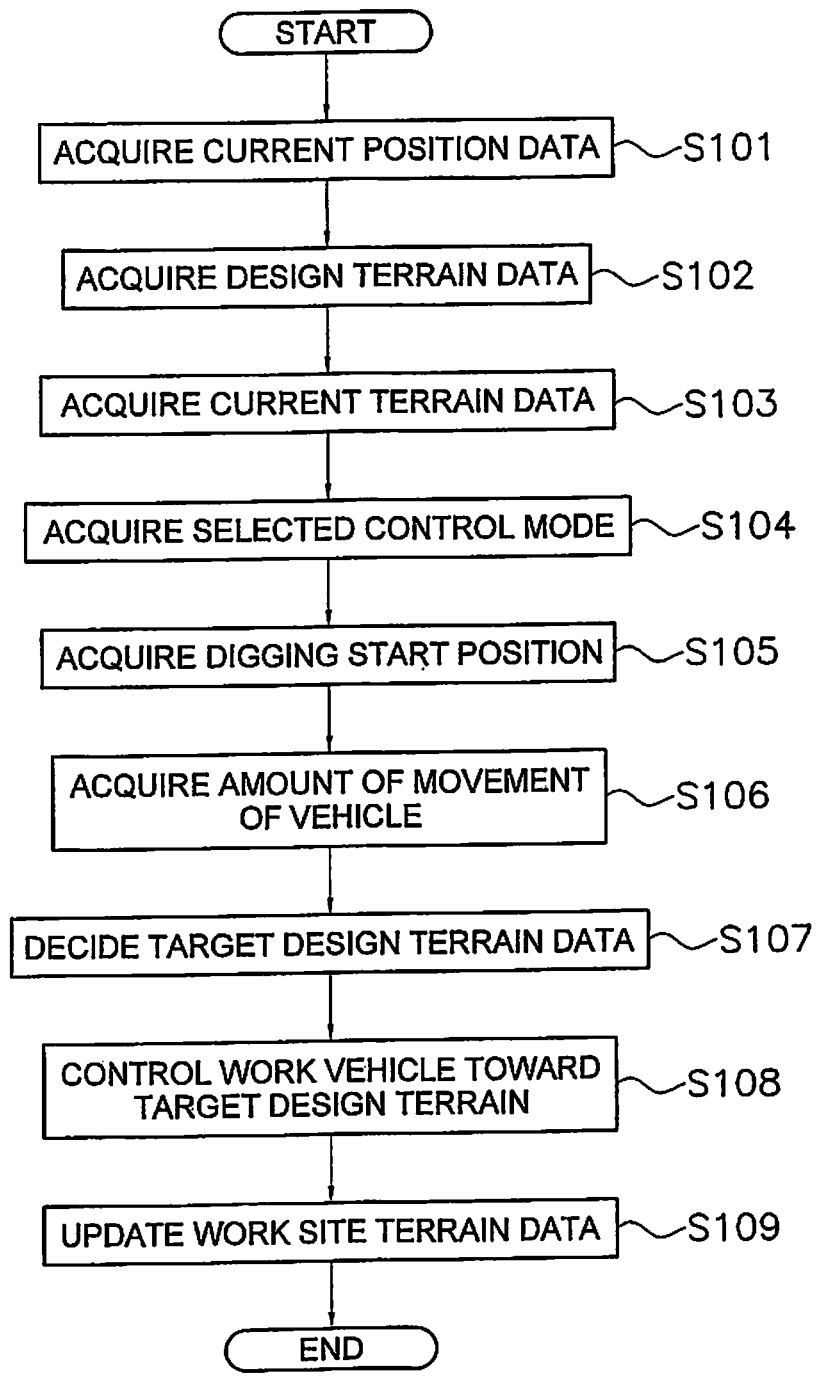
FIG. 4 is a flowchart of processing in the automatic control of a work implement.

The automatic control of the work implement 13 in digging work executed by the controller 26 will now be described. FIG. 4 is a flowchart of the processing involved in automatic control of the work implement 13 in digging work.

As shown in FIG. 4, in step S101 the controller 26 acquires current position data. Here, the controller 26 acquires the current cutting edge position P0 of the blade 18 as discussed above.

Figure 5:
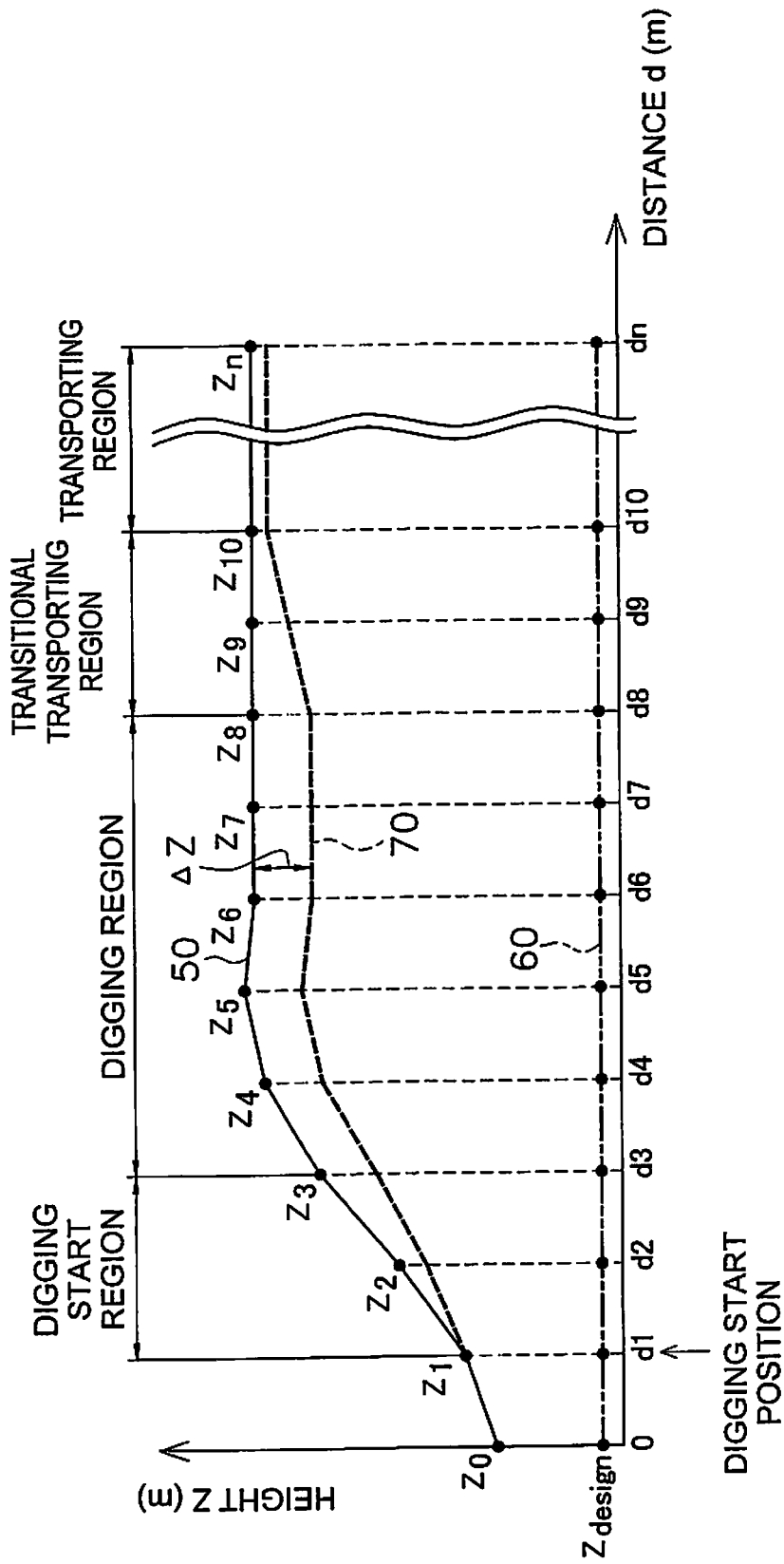
FIG. 5 is a graph showing an example of a final design terrain, a current terrain, and a target design terrain.

In step S102, the controller 26 acquires design terrain data. As shown in FIG. 5, the design terrain data includes the height $Z_{design}$ of the final design terrain 60 at a plurality of reference points in the travel direction of the work vehicle 1. The plurality of reference points indicate a plurality of points at specific intervals along the travel direction of the work vehicle 1. The plurality of reference points are on the travel path of the blade 18. In FIG. 5, the final design terrain 60 has a flat contour parallel to the horizontal direction, but it may have a different contour.

In step S103, the controller 26 acquires the current terrain data. The controller 26 acquires the current terrain data by calculation from the work site terrain data obtained from the storage device 28, and the vehicle position data and the travel direction data obtained from the position sensing device 31.

The current terrain data is information indicating the terrain located in the travel direction of the work vehicle 1. FIG. 5 is a cross section of the current terrain 50. In FIG. 5, the vertical axis is the height of the terrain, and the horizontal axis is the distance from the current position in the travel direction of the work vehicle 1.

More precisely, the current terrain data includes the heights $Z0$ to $Zn$ of the current terrain 50 at a plurality of reference points up to a specific terrain recognition distance do from the current position in the travel direction of the work vehicle 1. In this embodiment, the current position is a position determined on the basis of the current cutting edge position P0 of the work vehicle 1. However, the current position may be determined on the basis of the current position of another part of the work vehicle 1. The plurality of reference points are arranged at specific intervals, such as every meter.

In step S104 the controller 26 acquires the selected control mode. The controller 26 acquires the control mode selected by the above-mentioned setting device 25b.

In step S105 the controller 26 acquires the digging start position. For example, the controller 26 acquires as the digging start position (the work start position) the position when the cutting edge position P0 first drops below the height $Z0$ of the current terrain 50. Consequently, the position at which the cutting edge of the blade 18 is lowered and digging of the current terrain 50 is started is acquired as the digging start position. However, the controller 26 may acquire the digging start position by some other method. For example, the controller 26 may acquire the digging start position on the basis of the operation of the operating device 25a. For instance, the controller 26 may acquire the digging start position on the basis of the operation of a button, a screen operation with a touch panel, etc.

In step S106 the controller 26 acquires the amount of movement of the work vehicle 1. The controller 26 acquires the distance traveled from the digging start position to the current position in the travel path of the blade 18 as the amount of movement. The amount of movement of the work vehicle 1 may be the amount of movement of the vehicle body 11. Alternatively, the amount of movement of the work vehicle 1 may be the amount of movement of the cutting edge of the blade 18.

In step S107 the controller 26 decides the target design terrain data. The target design terrain data shows the target design terrain 70 indicated by a broken line in FIG. 5. The target design terrain 70 indicates the desired trajectory of the cutting edge of the blade 18 in operation. The target design terrain 70 is the target profile of the terrain to be worked, and shows the shape desired as the result of the digging work.

As shown in FIG. 5, the controller 26 decides the target design terrain 70 that is displaced downward from the current terrain 50 by the displacement distance ΔZ. The displacement distance ΔZ is the target displacement in the vertical direction at each reference point. In this embodiment, the displacement distance ΔZ is the target depth at each reference point, and indicates the target position of the blade 18 below the current terrain 50. The target position of the blade 18 means the cutting edge position of the blade 18. In other words, the displacement distance ΔZ indicates the soil volume per unit of movement dug by the blade 18. Therefore, the target design terrain data indicates the relation between a plurality of reference points and a plurality of target soil volumes.

The controller 26 decides the target design terrain 70 so as not to go below the final design terrain 60. Therefore, the controller 26 decides the target design terrain 70 located at or above the final design terrain 60 and below the current terrain 50 during digging work.

More precisely, the controller 26 decides the height Z of the target design terrain 70 according to the following formula (2).

$$Z = Zm - \Delta Z$$

$$\Delta Z = t1 * t2 * Z\_offset \quad \text{Formula 2}$$

Zm (m=1, . . . , n) is the height Z0 to Zn of the current terrain 50 at a plurality of reference points. ΔZ is the displacement distance, and indicates the digging depth in FIG. 5. Symbol t1 is a multiple based on traction force data indicating the magnitude of the traction force that can be utilized by the work vehicle. The traction force data is decided according to the selected load mode. The value of t1 increases in the order of a load mode of "light," "normal," and "heavy."

Symbol t2 is a multiple according to the blade specification data. The blade specification data is decided according to the selected blade specification. In "full" mode t2 is greater than in "semi" mode.

Figure 6:
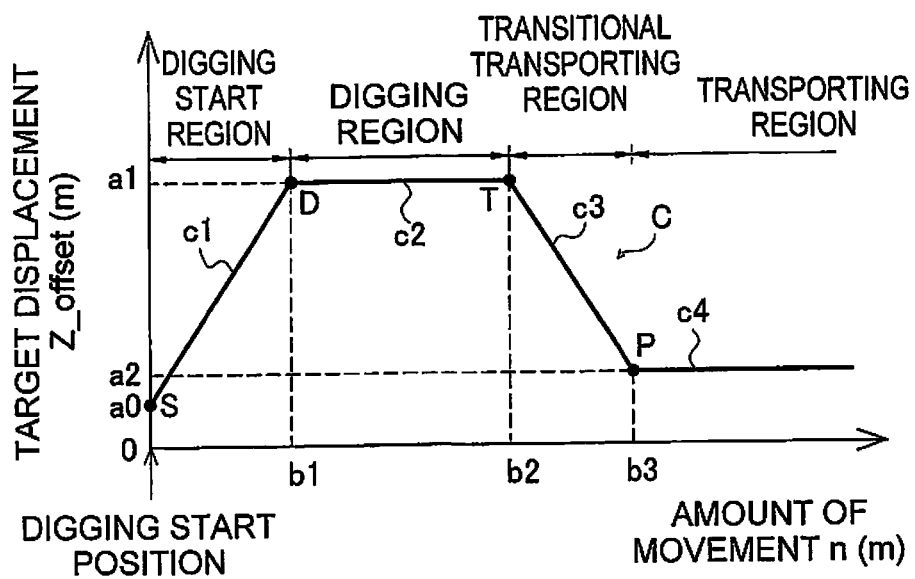
FIG. 6 is a graph showing an example of target displacement data.

Z_offset is the target displacement decided according to the amount of movement of the work vehicle 1. The target displacement Z_offset is an example of a target load parameter related to the load on the blade 18. The target displacement Z_offset indicates the amount of displacement in the height direction (vertical direction) of the blade 18 from the ground surface. FIG. 6 is a graph of an example of the target displacement data C. The target displacement data C indicates the digging depth (target displacement) Z_offset of the blade 18 in the vertical downward direction from the ground surface as a dependent variable of the amount of movement n of the work vehicle 1 in the horizontal direction. The amount of movement n of the work vehicle 1 in the horizontal direction is substantially the same as the amount of movement of the blade 18 in the horizontal direction. The controller 26 decides the target displacement Z_offset from the amount of movement n of the work vehicle 1 by referring to the target displacement data C shown in FIG. 6.

As shown in FIG. 6, the target displacement data C defines the relation between the amount of movement n of the work vehicle 1 and the target displacement Z_offset. The target displacement data C is stored in the storage device 28. For the sake of simplicity in the following description, it is assumed that the displacement distance ΔZ is equal to the target displacement Z_offset, and the values of t1 and t2 are both 1.

As shown in FIG. 6, the target displacement data C includes data at start c1, data during digging c2, data during transition c3, and data during transporting c4. The data at start c1 defines the relation between the amount of movement n in the digging start region and the target displacement Z_offset. The digging start region is the region from the digging starting point S to the steady digging starting point D. As indicated by the data at start c1, the target displacement Z_offset that gradually increases according to the increase in the amount of movement n is defined in the digging start region. The data at start c1 defines the target displacement Z_offset that linearly increases with respect to the amount of movement n.

The data during digging c2 defines the relation between the amount of movement n in the digging region and the target displacement Z_offset. The digging region is the region (first region) from the steady digging starting point D to the transitional transporting starting point T. As indicated by the data during digging c2, in the digging region, the target displacement Z_offset is defined as a constant value. The data during digging c2 defines a constant target displacement Z_offset with respect to the amount of movement n.

The data during transition c3 defines the relation between the amount of movement n and the target displacement Z_offset in the transitional transporting region. The transitional transporting region is the region from the steady digging end point T to the transporting starting point P. As indicated by the data during transition c3, the target displacement Z_offset that gradually decreases according to the increase in the amount of movement n is defined in the transitional transporting region. The data during transition c3 defines the target displacement Z_offset that linearly decreases with respect to the amount of movement n.

The data during transporting c4 defines the relation between the amount of movement n in the transporting region and the target displacement Z_offset. The transporting region is the region (second region) starting from the transporting starting point P. As indicated by the data during transporting c4, the target displacement Z_offset is defined as a constant value in the transporting region. The data during transporting c4 defines a constant target displacement Z_offset with respect to the amount of movement n.

More precisely, the digging region starts at a first start value b1 and ends at a first end value b2. The transporting region starts at a second start value b3. The first end value b2 is less than the second start value b3. Therefore, the digging region is started when the amount of movement n is less than that in the transporting region. The target displacement Z_offset in the digging region is constant at a first target value a1. The target displacement Z_offset in the transporting region is constant at a second target value a2. The first target value a1 is greater than the second target value a2. Therefore, in the digging region, the displacement distance ΔZ is defined to be greater than in the transporting region.

The target displacement Z_offset at the digging start position is a start value a0. The start value a0 is less than the first target value a1. The start target value a0 is also less than the second target value a2.

Figure 7:
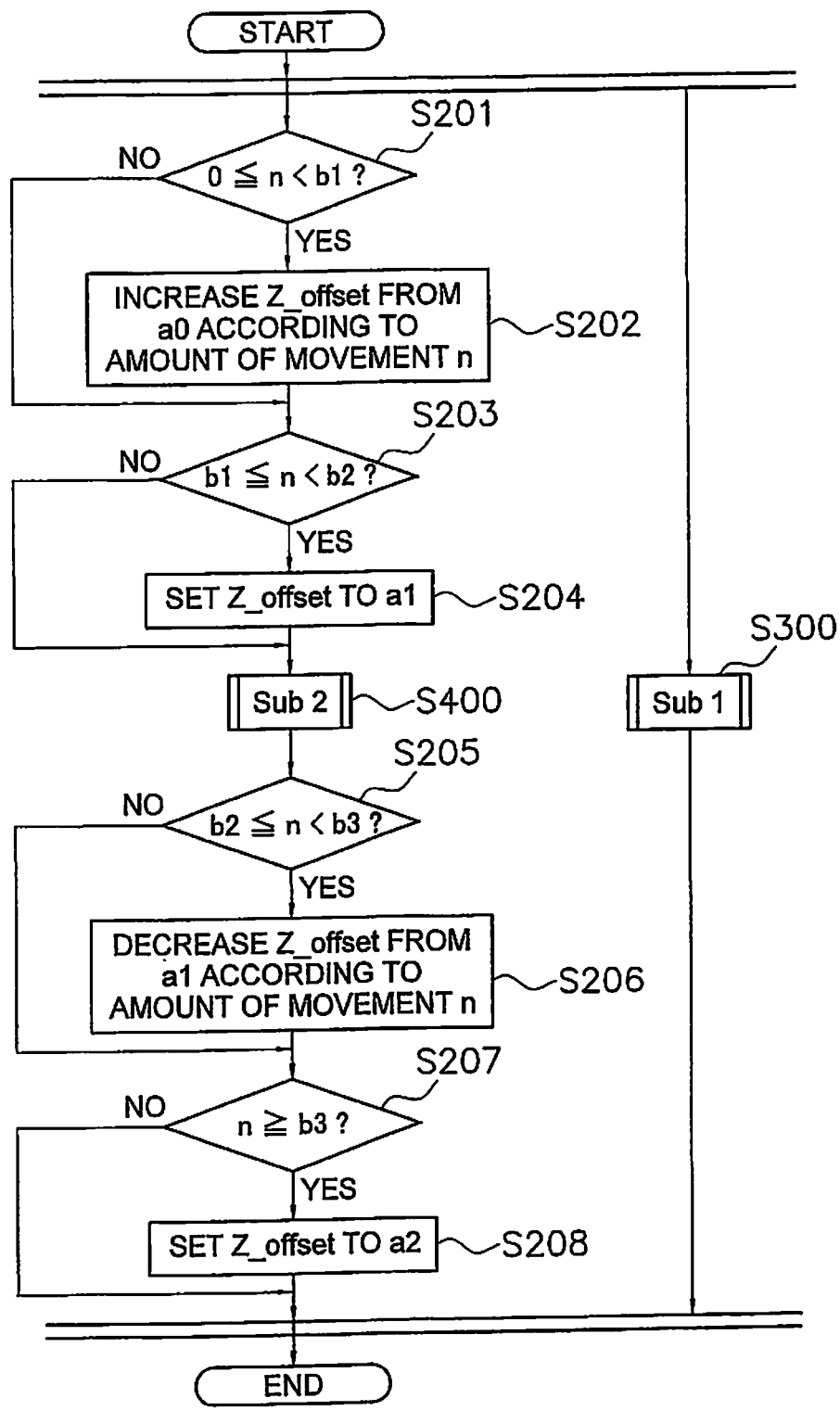
FIG. 7 is a flowchart of the processing for deciding a target displacement.

FIG. 7 is a flowchart showing the processing for deciding the target displacement Z_offset. In order to simplify the description, let us assume that in the decision processing described below, the travel of the work vehicle 1 is only forward. The decision processing is started when the operating device 25a moves to the forward position. In step S201, the controller 26 determines whether the amount of movement n is equal to or greater than 0 and less than the first start value b1. When the amount of movement n is equal to or greater than 0 and less than the first start value b1, in step S202 the controller 26 gradually increases the target displacement Z_offset from the start value a0 according to the increase in the amount of movement n.

The start value a0 is a constant and is stored in the storage device 28. It is preferable for the start value a0 to be small enough that the load on the blade 18 at the start of digging will not be excessively high. The first start value b1 is found by calculation from the gradient c1 in the digging start region shown in FIG. 6, the start value a0, and the first target value a1. The gradient c1 is a constant and is stored in the storage device 28. It is preferable for the gradient c1 to be a value at which it is possible to transition quickly from the digging start to the digging work, and the load on the blade 18 will not be excessively high.

In step S203 the controller 26 determines whether the amount of movement n is equal to or greater than the first start value b1 and less than the first end value b2. When the amount of movement n is equal to or greater than the first start value b1 and less than the first end value b2, in step S204 the controller 26 sets the target displacement Z_offset to the first target value a1. The first target value a1 is a constant and is stored in the storage device 28. It is preferable for the first target value a1 to be a value at which digging can be performed efficiently and the load on the blade 18 will not be excessively high.

After the processing of step S204, the processing proceeds to a second subroutine Sub2 of step S400. The processing of a first subroutine Sub1 of step S300 is performed in parallel with the processing from steps S201 to S208 of the main routine. The first subroutine Sub1 and the second subroutine Sub2 will be discussed below.

In step S205 the controller 26 determines whether the amount of movement n is equal to or greater than the first end value b2 and less than the second start value b3. When the amount of movement n is equal to or greater than the first end value b2 and less than the second start value b3, in step S206 the controller 26 gradually decreases the target displacement Z_offset from the first target value a1 according to the increase in the amount of movement n.

The first end value b2 is the amount of movement when the current held soil volume of the blade 18 is over a specific threshold. Therefore, when the current held soil volume of the blade 18 goes over a specific threshold, the controller 26 decreases the target displacement Z_offset from the first target value a1. This specific threshold is decided on the basis of the maximum capacity of the blade 18, for example. For instance, the current held soil volume of the blade 18 may be decided by measuring the load on the blade 18 and calculating from this load. Alternatively, the current held soil volume of the blade 18 may be calculated by using a camera to capture an image of the blade 18 and analyzing this image.

At the start of work, a specific initial value is set as the first end value b2. After the start of work, the amount of movement when the held soil volume of the blade 18 goes over a specific threshold is stored as an update value, and the first end value b2 is updated on the basis of the stored update value.

In step S207 the controller 26 determines whether the amount of movement n is equal to or greater than the second start value b3. When the amount of movement n is equal to or greater than the second start value b3, in step S208 the controller 26 sets the target displacement Z_offset to the second target value a2.

The second target value a2 is a constant and is stored in the storage device 28. The second target value a2 is preferably set to a value suitable for transporting work. The second start value b3 is found by calculation from the gradient c2 in the transitional transporting region shown in FIG. 6, the first target value a1, and the second target value a2. The gradient c2 is a constant and is stored in the storage device 28. It is preferable for the gradient c2 to be a value at which it is possible to transition quickly from digging work to transporting work, and the load on the blade 18 will not be excessively high.

The start value a0, the first target value a1, and the second target value a2 may be changed according to the situation of the work vehicle 1, etc. The first start value b1, the first end value b2, and the second start value b3 may be stored in the storage device 28 as constants.

Figure 8:
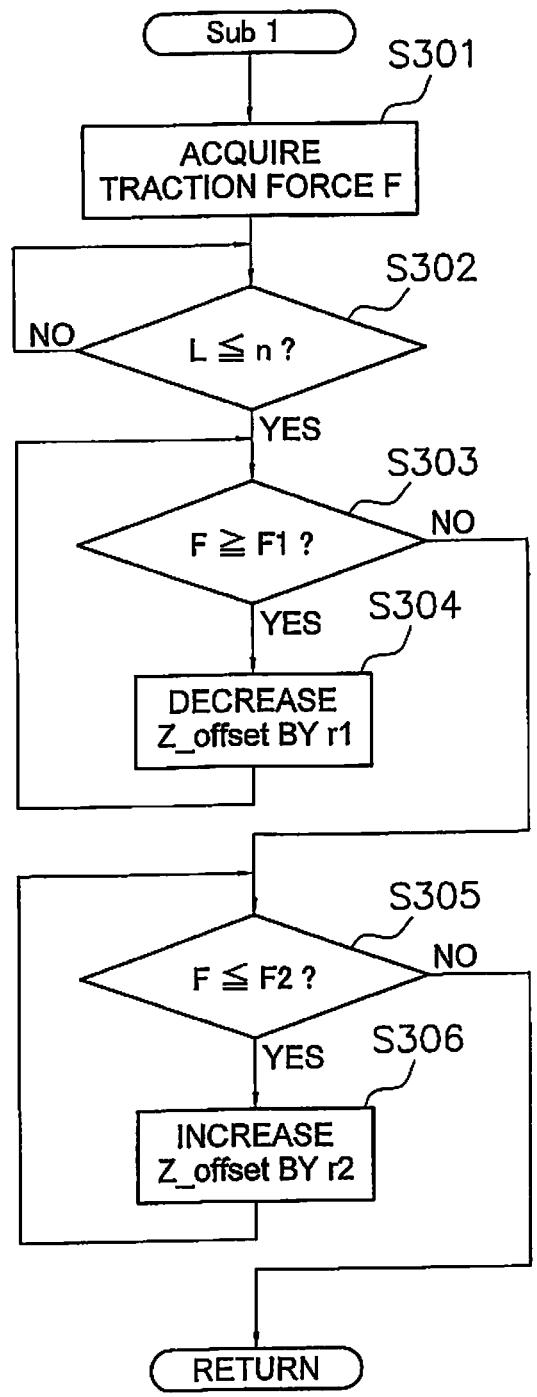
FIG. 8 is a flowchart of the processing for deciding a target displacement.

Next, the processing of the above-mentioned first subroutine Sub1 and second subroutine Sub2 will be described. The processing of the first subroutine Sub1 and the second subroutine Sub2 is processing for modifying and optimizing the target displacement data C according to the traction force. FIG. 8 is a flowchart of the processing of the first subroutine Sub1.

First, in step S301 the controller 26 acquires a traction force F. The controller 26 acquires the traction force F by calculating it from the sensed value of the output sensor 34.

In step S302, the controller 26 decides whether the movement amount n is equal to or greater than a threshold L. The threshold L is set, for example, to a value such that the first subroutine Sub1 is executed in a region that excludes the initial stage of the digging start region. Alternatively, the threshold L may be set to a value such that the first subroutine Sub1 is executed in a region beyond the digging region. Alternatively, the threshold L may be set to a value such that the first subroutine Sub1 is executed in a region beyond the transporting region.

Figure 9:
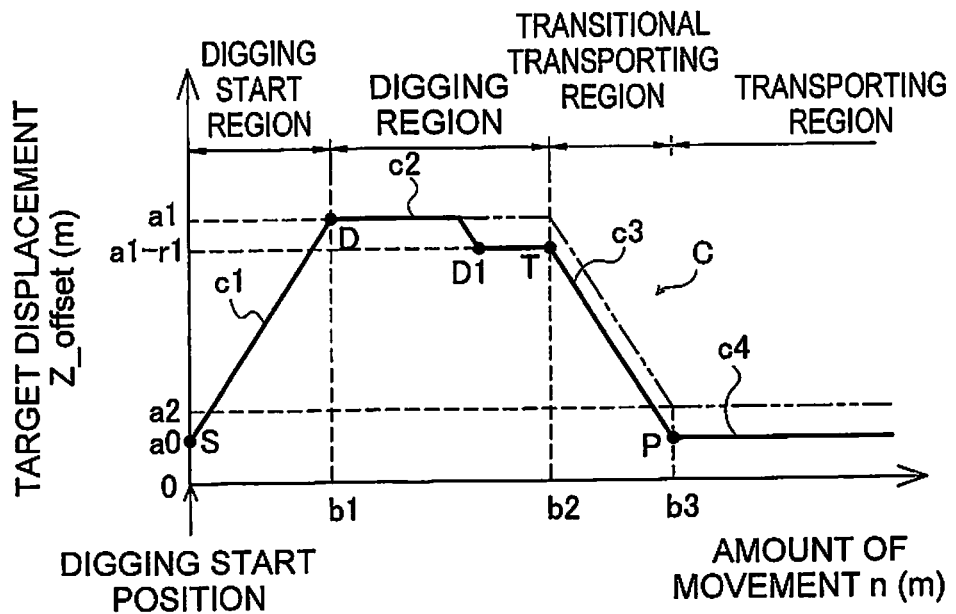
FIG. 9 is a graph showing an example of modified target displacement data.

In step S303, the controller 26 determines whether the traction force F is equal to or greater than the first threshold F1. More precisely, the controller 26 determines whether the traction force F is equal to or greater than the first threshold F1 and whether the duration of that state is equal to or greater than a specific time t. When the traction force F is equal to or greater than the first threshold F1, the processing proceeds to step S304. In step S304, the value of the target height displacement Z_offset is reduced by a specific value r1. Consequently, as shown in FIG. 9, the data target displacement data C is modified to data in which the target displacement Z_offset is decreased by the specific value r1, from the point D1 of the amount of movement when the traction force F becomes equal to or greater than the first threshold F1. Also, the controller 26 continues this processing until the traction force F drops below the first threshold F1.

Figure 10:
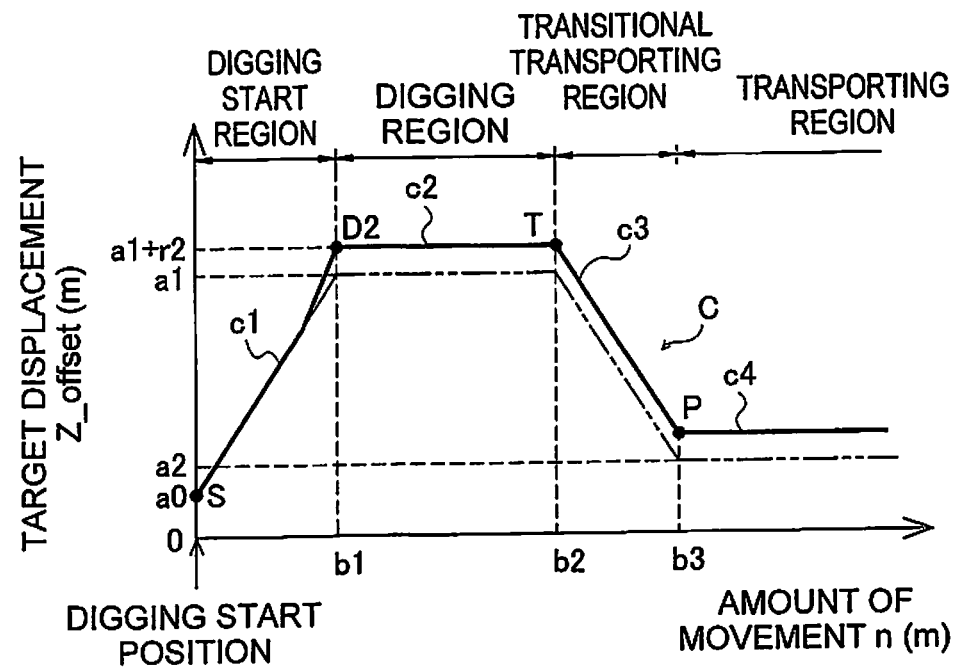
FIG. 10 is a graph showing an example of modified target displacement data.

Next, in step S305 the controller 26 determines whether the traction force F is equal to or less than the second threshold F2. When the traction force F is equal to or less than the second threshold F2, the processing proceeds to step S306. In step S306 the controller 26 increases the value of the target displacement Z_offset by a specific value r2. Consequently, as shown in FIG. 10, the target displacement data C is modified to data in which the data target displacement Z_offset is increased by the specific value r2, from the point D2 of the amount of movement when the traction force F drops equal to or less than the second threshold F2. Also, the controller 26 continues this processing until the traction force F becomes greater than the second threshold F2.

The first threshold F1 is preferably set to a value such that the traction force during digging will not become too high for the work vehicle 1. The second threshold F2 is preferably set to a value such that the traction force during digging is as will not become too low for the work vehicle 1, making work more difficult. The specific values r1 and r2 may be different from each other, or may be the same value. The specific values r1 and r2 are preferably set to values such that the traction force will change too much.

Figure 11:
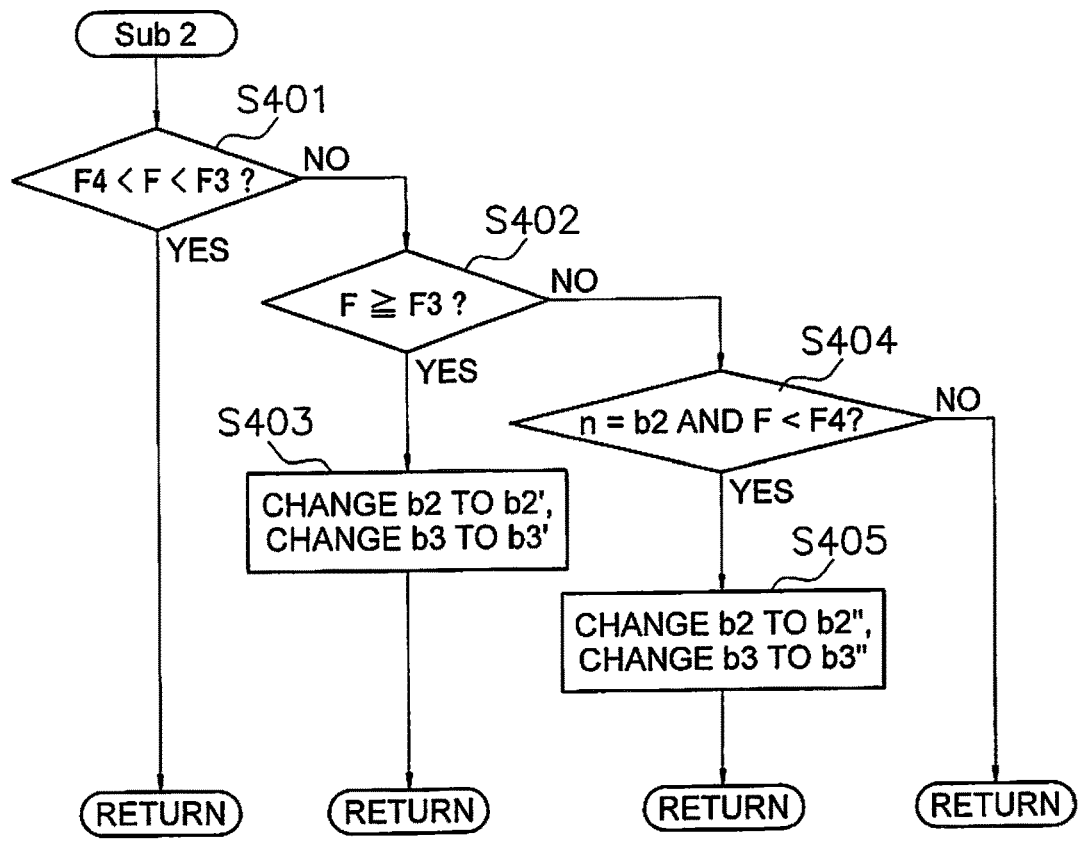
FIG. 11 is a flowchart of the processing for deciding a target displacement.

FIG. 11 is a flowchart of the processing in the second subroutine Sub2. After the processing of step S204 shown in FIG. 7, the processing proceeds to subroutine 2 (Sub2) shown in FIG. 11.

As shown in FIG. 11, first, in step S401 the controller 26 determines whether the traction force F of the work vehicle 1 is less than the third threshold F3 and greater than the fourth threshold F4. Specifically, the controller 26 determines whether the traction force F is less than the third threshold and greater than the fourth threshold F4, and whether the duration of that state is equal to or greater than a specific time t. In the following description, the conditions for the duration when determining the magnitude of the traction force F will be omitted in order to simplify the description. When the traction force F is less than the third threshold F3 and greater than the fourth threshold F4, the processing returns to the main routine shown in FIG. 7, and the flow proceeds to step S205. When the traction force F is outside the range of being less than the third threshold F3 and greater than the fourth threshold F4, the processing proceeds to step S402.

In step S402, the controller 26 determines whether the traction force F is equal to or greater than the third threshold F3. When the traction force F is equal to or greater than the third threshold F3, the processing proceeds to step S403. In step S403, the controller 26 changes the first end value from b2 to b2', and changes the second start value from b3 to b3'. b2' is a value less than b2. b3' is a value less than b3. b3' is equal to b3−(b2−b2').

The third threshold F3 is preferably set to a value such that the traction force during digging will not become too high for the work vehicle 1. b2' may be the amount of movement when the traction force F becomes equal to or greater than the third threshold F3. b3' may be calculated from the gradient of the data during transition c3 and b2'.

Figure 12:
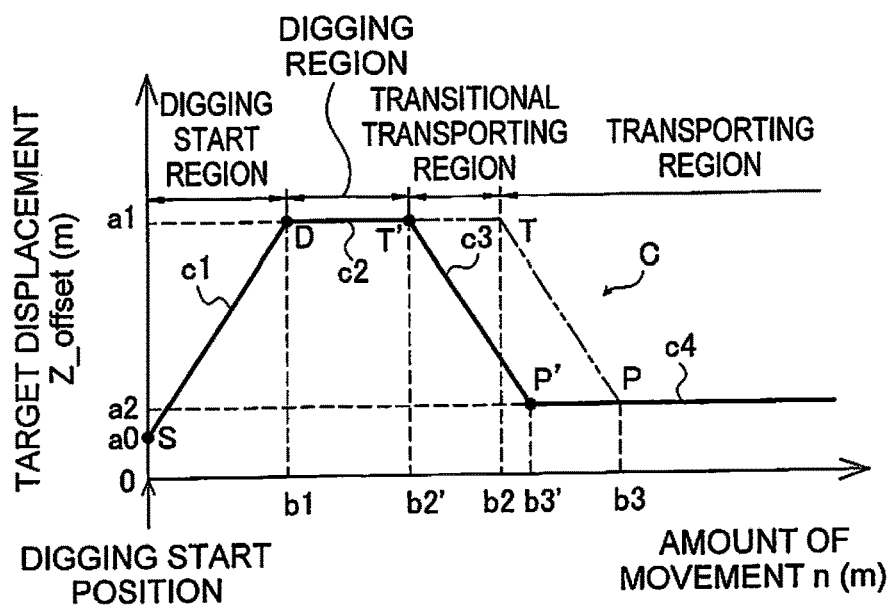
FIG. 12 is a graph showing an example of modified target displacement data.

Consequently, as shown in FIG. 12, the steady digging end point is changed from T to T', so that the end of the digging region comes sooner. Also, the transporting starting point is changed from P to P', so that the start of the transporting region comes sooner.

In step S402, when the traction force F is less than the third threshold F3, the processing proceeds to step S404. In step S404, the controller 26 determines whether the traction force F is less than the fourth threshold F4 at the moving amount b2. When the traction force F is less than the fourth threshold F4, the processing proceeds to step S405. In step S405, the controller 26 changes the first end value from b2 to b2", and changes the second start value from b3 to b3". The value of b2" is greater than that of b2. The value of b3" is greater than that of b3. In addition, b3" is equal to b3+(b2"−b2).

Figure 13:
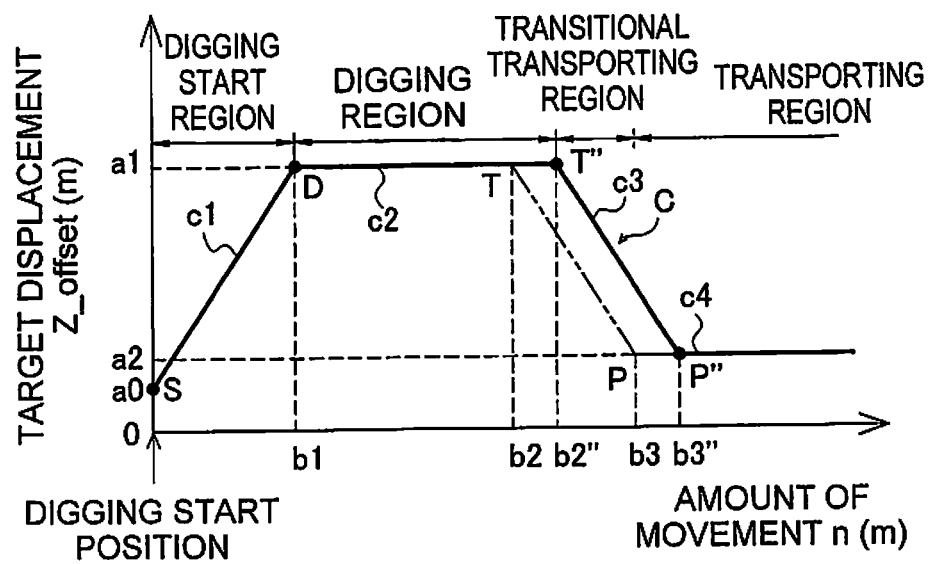
FIG. 13 is a graph showing an example of modified target displacement data.

Consequently, as shown in FIG. 13, the steady digging end point is changed from T to T", and the end of the digging region is extended. Also, the transporting starting point is changed from P to P''', and the start of the transporting region is delayed.

The fourth threshold F4 is preferably set to a value such that traction force during digging will not be too low for the work vehicle 1, making work more difficult. The values of b2" and b3" may be specific values set in advance. Alternatively, b2" may be the amount of movement when the traction force F becomes equal to or greater than the fourth threshold F4. The value of b3" may be calculated from the gradient of the data during transition c3 and b2".

When the determination in step S405 is negative, the processing returns to the main routine shown in FIG. 7, and the flow proceeds to step S205.

As discussed above, the height Z of the target design terrain 70 is decided by deciding the target displacement Z_offset.

In step S108 shown in FIG. 4, the controller 26 controls the blade 18 toward the target design terrain 70. Here, the controller 26 generates a command signal to the work implement 13 so that the cutting edge position of the blade 18 moves toward the target design terrain 70 produced in step S107. The generated command signal is inputted to the control valve 27. Consequently, the cutting edge position P0 of the work implement 13 moves along the target design terrain 70.

In the above-mentioned digging region, the displacement distance ΔZ between the current terrain 50 and the target design terrain 70 is greater than in other regions. Consequently, in the digging region, digging work is performed on the current terrain 50. In the transporting region, the displacement distance ΔZ between the current terrain 50 and the target design terrain 70 is less than in other regions. Consequently, in the transporting region, digging of the ground surface is held off, and soil held in the blade 18 is conveyed.

In step S109 the controller 26 updates the work site terrain data. The controller 26 acquires, as current terrain data, position data indicating the latest trajectory of the cutting edge position P0, and updates the work site terrain data with the acquired current terrain data. Alternatively, the controller 26 may calculate the position of the bottom face of the crawler belt 16 from the vehicle body position data and the vehicle body size data, and acquire position data indicating the trajectory of the bottom face of the crawler belt 16 as current terrain data. In this case, the updating of the work terrain data can be carried out instantly.

Alternatively, the current terrain data may be generated from survey data measured by a surveying device outside the work vehicle 1. Aerial laser surveying may be used as an external surveying device, for example. Alternatively, the current terrain 50 may be photographed with a camera, and current terrain data may be generated from the image data obtained by the camera. For example, aerial photographic surveying using a UAV (unmanned aerial vehicle) may be used. In the case of an external surveying device or a camera, the work site terrain data is updated at specific intervals, or whenever needed.

The above processing is executed when the work vehicle 1 is moving forward. For example, the above processing is executed when the operating device 25a of the drive unit 12 is in the forward position. However, if the work vehicle 1 travels in reverse by at least a specific distance, the digging start position and the amount of movement n are initialized. The held soil volume of the blade 18 is also initialized. The controller 26 decides and updates the target design terrain 70 with respect to a plurality of reference points every time the work vehicle advances a specific distance. However, the controller 26 may maintain the initially decided target design terrain 70 until the work vehicle is switched from forward to reverse.

The above processing is executed when the work vehicle 1 moves forward again. The controller 26 updates the current terrain 50 based on the updated work site terrain data, and decides the new target design terrain 70 on the basis of the updated current terrain 50. The controller 26 then controls the blade 18 along the newly decided target design terrain 70. This processing is repeated to perform digging so that the current terrain 50 approaches the final design terrain 60.

With the control system 3 of the work vehicle 1 according to this embodiment and described above, the controller 26 decides the displacement distance $\Delta Z$ according to the amount of movement n by referring to target displacement data. The controller 26 then decides a target design terrain 70 that is displaced vertically by the displacement distance $\Delta Z$ from the current terrain 50. Thus controlling the blade 18 toward the target design terrain 70 allows the work to be carried out more smoothly, without producing large bumps or valleys.

In digging work, when the amount of movement n of the work vehicle 1 is small, the held soil volume of the blade 18 is also small. Therefore, digging work can be performed more efficiently by setting a large displacement distance $\Delta Z$ in the digging region where the amount of movement n is small.

When the amount of movement n of the work vehicle 1 is large, the held soil volume of the blade 18 is also large. Therefore, the held soil volume can be prevented from becoming too large by setting a small displacement distance $\Delta Z$ in the transporting region where the amount of movement of the work vehicle 1 is large. This prevents an excessive load from being exerted on the blade 18. Or, the amount of soil that leaks from the blade 18 can be kept low.

The controller 26 decides the first end value b2 to be the amount of movement n of the work vehicle 1 at the point when the current held soil volume goes over a specific threshold. This more accurately prevents the held soil volume from becoming excessive.

The controller 26 modifies the target displacement data C according to the magnitude of the traction force F of the work vehicle 1. Consequently, the controller 26 modifies the target design terrain 70 according to the magnitude of the traction force F of the work vehicle 1. This allows the target design terrain 70 to be optimized according to the traction force F. This will be described by giving a specific example. Let us assume that the work implement of the work vehicle 1 is controlled so that control to operate along the target design terrain 70 is carried out simultaneously with the load control of prior art. During operation of the work implement 13 along the target design terrain 70, when the traction force goes over a specific value, the work implement 13 is raised by load control. When the traction force drops to or under the specific value, the work implement control by load control is halted, control along the target design terrain 70 comes into play, and the work implement 13 is lowered. Accordingly, unevenness occurs on the work surface. With the work vehicle 1 according to the present embodiment, since the controller 26 modifies the target design terrain 70 according to the traction force, the above-mentioned unevenness is less likely to occur.

An embodiment of the present invention was described above, but the present invention is not limited to or by the above embodiment, and various modifications are possible without departing from the gist of the invention.

The work vehicle 1 is not limited to a bulldozer, and may be some other vehicle such as a wheel loader or a motor grader.

The work vehicle 1 may also be a vehicle that can be operated remotely. In that case, part of the control system 3 may be located outside of the work vehicle 1. For example, the controller 26 may be located outside of the work vehicle 1. The controller 26 may be disposed in a control center that is away from the work site.

Figure 14:
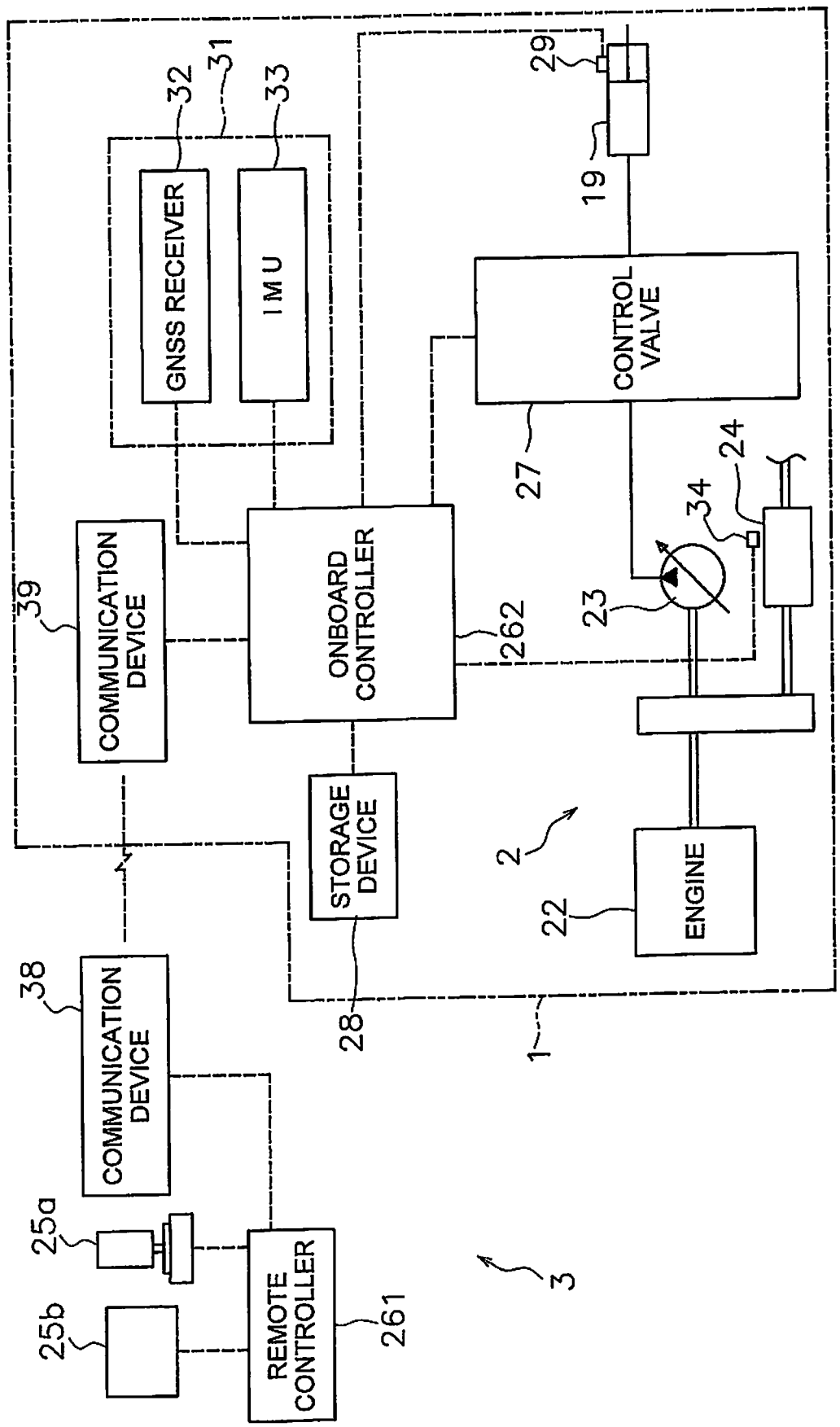
FIG. 14 is a block diagram of the configuration of a control system according to a first modification example.

The controller 26 may have a plurality of controllers separate from one another. For example, as shown in FIG. 14, the controller 26 may include a remote controller 261 disposed outside of the work vehicle 1 and an onboard controller 262 installed in the work vehicle 1. The remote controller 261 and the onboard controller 262 may be capable of communicating wirelessly via communication devices 38 and 39. Some of the functions of the controller 26 discussed above may be executed by the remote controller 261, and the rest by the onboard controller 262. For example, processing for deciding the target design terrain 70 may be executed by the remote controller 261, and processing for outputting a command signal to the work implement 13 may be performed by the onboard controller 262.

The operating device 25a may be disposed outside of the work vehicle 1. In that case, the cab may be omitted from the work vehicle 1. Alternatively, the operating device 25a may be omitted from the work vehicle 1. The work vehicle 1 may be operated by automatic control under the controller 26 alone, without any input from the operating device 25a.

Figure 15:
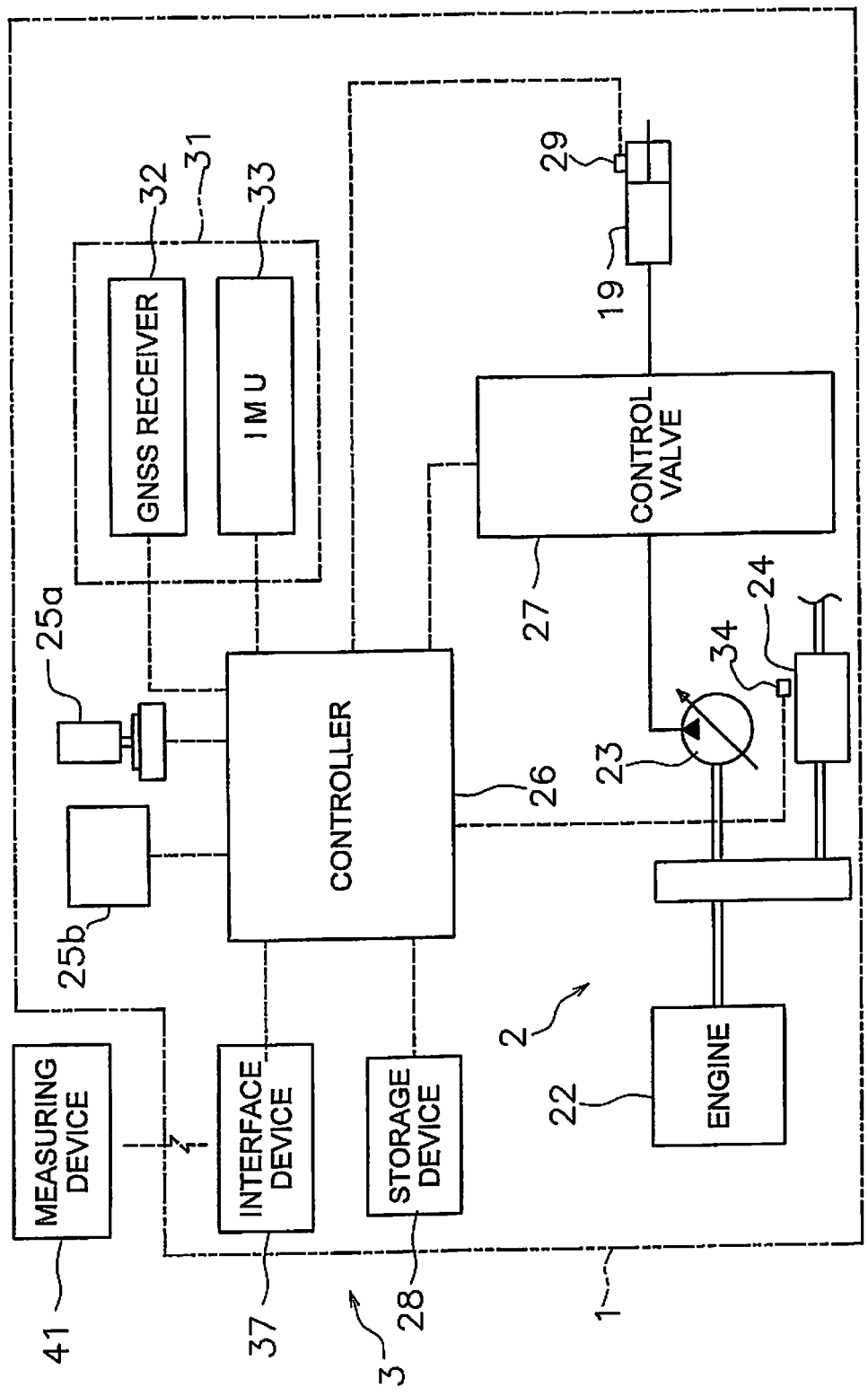
FIG. 15 is a block diagram of the configuration of a control system according to a second modification example.

The current terrain 50 may be acquired from some other device besides the above-mentioned position detecting device 31. For example, as shown in FIG. 15, the current terrain 50 may be acquired by an interface device 37 that receives data from an external device. The interface device 37 may wirelessly receive current terrain data measured by an external measuring device 41. Alternatively, the interface device 37 may be a recording medium reader and may receive current terrain data measured by the external measuring device 41 via a recording medium.

The controller 26 may decide the target design terrain 70 on the basis of the current terrain 50 that has been smoothed. That is, the controller 26 may decide the target design terrain 70 that has been displaced by the displacement distance $\Delta Z$ from the smoothed current terrain 50. Smoothing means processing to smooth out the height changes in the current terrain 50. For example, the controller 26 smoothes the heights Z0 to Zn at a plurality of points in the current terrain 50 according to the following formula (3).

$$Z_{n\_sm} = (\Sigma_{k=n-2}^{n+2} Z_k)/5 \qquad \text{Formula 3}$$

Zn_sm indicates the height of each point in the smoothed current terrain 50. In Formula 3 smoothing is performed using the average value for height at five points. However, the number of points used in the smoothing may be less than five or greater than five. The number of points used for smoothing can be varied, and the operator can set the desired degree of smoothing by changing the number of points used for smoothing. Also, what is calculated is not limited to the average value of the height of a point to be smoothed and points ahead and behind, and may also be the average value of the height of a point to be smoothed and points ahead. Alternatively, the average value of the height of a point to be smoothed and points located behind may be calculated. Or, some other smoothing processing may be used, and not just the average value.

The target displacement data may be data indicating the relation between a target load parameter and the amount of movement. Alternatively, the controller 26 may decide the target design terrain by referring to target load parameter data indicating the relation between a target load parameter and the current position of the work vehicle 1. As long as it is a parameter related to the load on the work implement 13, the target load parameter is not limited to target displacement as in the above embodiment.

Figure 16:
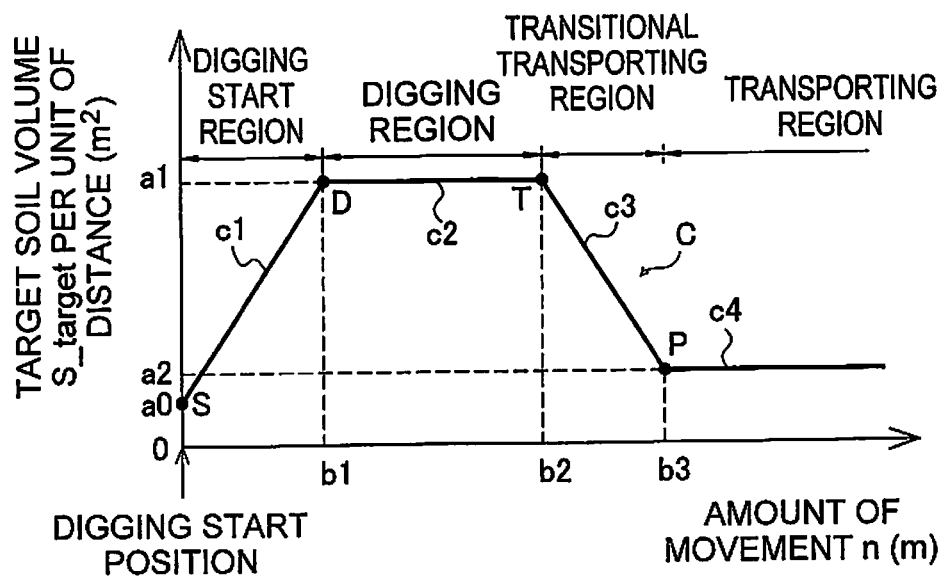
FIG. 16 is a graph showing an example of target load parameter data.

For example, FIG. 16 is a diagram showing another example of target load parameter data. As shown in FIG. 16, the target load parameter may be the target soil volume S_target for each point in a flat terrain. Specifically, the target load parameter may be the target soil volume S_target per unit of distance. For example, the controller 26 can calculate the displacement distance ΔZ from the target soil volume S_target and the width of the blade 13.

Alternatively, the target load parameter may be a parameter that is different from the target soil volume S_target per unit of distance. For example, the target load parameter may be a parameter indicating the target value of the load on the work implement 13 at each point. The controller 26 can calculate the displacement distance ΔZ at each point from the target load parameter. In that case, the controller 26 may increase the displacement distance ΔZ according to the increase in the target load parameter.

Figure 17:
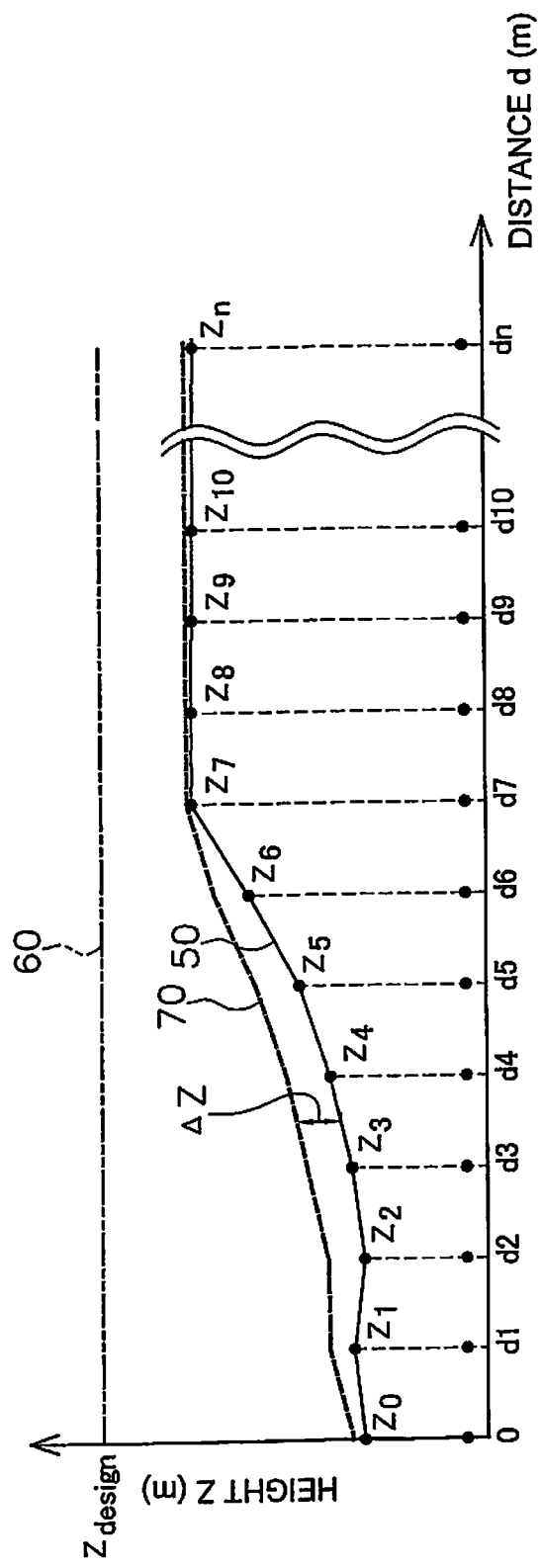
FIG. 17 is a graph showing another example of a target design terrain.
Figure 18:
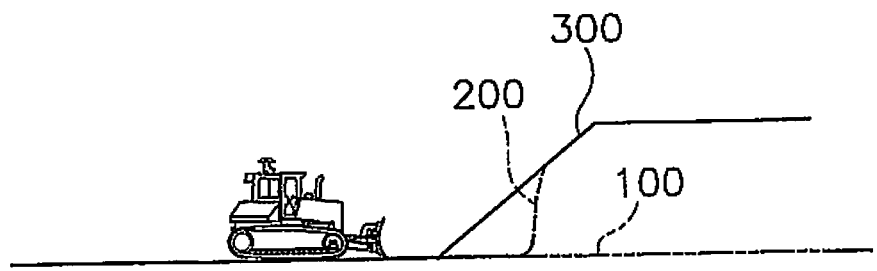
FIG. 18 is a diagram of digging work according to prior art.

As shown in FIG. 17, the controller 26 may decide a target design terrain 70 that is displaced upward by the displacement distance ΔZ from the current terrain 50. In this case, it is possible to perform embankment work instead of digging work.

INDUSTRIAL APPLICABILITY

With the present invention, work can be performed efficiently under automatic control and to it will be less likely that work will form terrain with large irregularities.

The invention claimed is:

1. A control system for a work vehicle including a work implement, the control system comprising:
   a controller programmed to
      decide a target profile of a work site,
      acquire current position data that indicates a current position of the work vehicle,
      acquire current terrain data that indicates a current terrain of the work site,
      acquire an amount of movement of the work vehicle from a work start position from the current position data,
      decide a target displacement from the amount of movement by referring to target displacement data that indicates the target displacement corresponding to the amount of movement,
      decide a target design terrain in which the current terrain is displaced vertically by the target displacement,
      set the target design terrain as the target profile,
      generate a command signal to move the work implement according to the target profile,
      acquire a load to which the work vehicle is subjected,
      modify the target profile according to a magnitude of the load, and
      generate a command signal to operate the work implement according to the modified target profile.

2. The control system for a work vehicle according to claim 1, wherein
   the controller is further programmed to modify the target profile by modifying the target displacement data according to the magnitude of the load.

3. The control system for a work vehicle according to claim 1, wherein
   the controller is further programmed to
      acquire current terrain data that indicates a current terrain of the work site,
      decide a target design terrain in which the current terrain is displaced vertically based on the current terrain data, and
      set the target design terrain as the target profile.

4. The control system for a work vehicle according to claim 1, wherein
   the controller is further programmed to modify the target displacement according to the magnitude of the load.

5. The control system for a work vehicle according to claim 4, wherein
   the controller is further programmed to decrease the target displacement when the load is equal to or greater than a first threshold.

6. The control system for a work vehicle according to claim 4, wherein
   the controller is further programmed to increase the target displacement when the load is equal to or less than a second threshold.

7. The control system for a work vehicle according to claim 3, wherein
   the target displacement data includes a first region and a second region,
   the first region defines the target displacement when the amount of movement is between a first start value and a first end value,
   the second region defines the target displacement when the amount of movement is greater than a second start value,
   in the first region, the target displacement is defined to be greater than in the second region, and
   the controller is further programmed to modify at least one of the first end value and the second start value according to the magnitude of the load.

8. The control system for a work vehicle according to claim 7, wherein
   the controller is further programmed to decrease at least one of the first end value and the second start value when the load is equal to or greater than a third threshold.

9. The control system for a work vehicle according to claim 7, wherein
   the controller is further programmed to increase at least one of the first end value and the second start value when the load is equal to or less than a fourth threshold.

10. A method for setting a trajectory of a work implement of a work vehicle, the method comprising:

deciding a target profile of a work site;

acquiring current position data that indicates a current position of the work vehicle;

acquiring current terrain data that indicates a current terrain of the work site;

acquiring an amount of movement of the work vehicle from a work start position;

deciding a target displacement from the amount of movement by referring to target displacement data that indicates the target displacement corresponding to the amount of movement deciding a target design terrain in which the current terrain is displaced vertically based on the current position data and the current terrain data;

setting the target design terrain as the target profile;

setting the trajectory of the work implement to move the work implement according to the target profile;

acquiring a load on the work vehicle;

modifying the target profile according to a magnitude of the load; and setting the trajectory of the work implement to operate the work implement according to the modified target profile.

11. The method for setting the trajectory of a work implement according to claim 10, wherein the target displacement is modified according to the magnitude of the load.

12. The method for setting the trajectory of a work implement according to claim 10, wherein the target displacement data includes a first region and a second region, the first region defines the target displacement when the amount of movement is between a first start value and a first end value, the second region defines the target displacement when the amount of movement is greater than a second start value, in the first region, the target displacement is defined to be greater than in the second region, and at least one of the first end value and the second start value are modified according to the magnitude of the load.

13. A work vehicle comprising:

a work implement; and a controller programmed to:

acquire current position data that indicates a current position of the work vehicle, acquire current terrain data that indicates a current terrain of the work site, decide a target design terrain in which the current terrain is displaced vertically, acquire an amount of movement of the work vehicle from a work start position from the current position data, decide a target displacement from the amount of movement by referring to target displacement data that indicates a target displacement corresponding to the amount of movement, decide a target design terrain in which the current terrain is displaced vertically by the target displacement, set the target design terrain as a target profile of a work site, generate a command signal to move the work implement according to the target profile, acquire a load to which the work vehicle is subjected, modify the target profile according to a magnitude of the load, and generate a command signal to operate the work implement according to the modified target profile.

14. The work vehicle according to claim 13, wherein the controller is further programmed to modify the target displacement according to the magnitude of the load.

15. The work vehicle according to claim 13, wherein the target displacement data includes a first region and a second region, the first region defines the target displacement when the amount of movement is between a first start value and a first end value, the second region defines the target displacement when the amount of movement is greater than a second start value, in the first region, the target displacement is defined to be greater than in the second region, and the controller is further programmed to modify at least one of the first end value and the second start value according to the magnitude of the load.

* * * * *